United States Patent [19]

Okazaki et al.

[11] Patent Number: 5,412,266
[45] Date of Patent: May 2, 1995

[54] MINIATURE MOTOR WITH MAGNETIZED ROTOR END FACES FORMING AXIAL MAGNETIC ATTRACTION FORCE BETWEEN ROTOR AND HOUSING

[75] Inventors: Akira Okazaki; Shinichi Matsuda; Takanobu Lee; Ikuo Matsushita; Masao Take, all of Matsudo, Japan

[73] Assignee: Mabuchi Motor Co. Ltd., Chiba, Japan

[21] Appl. No.: 50,845

[22] Filed: Apr. 21, 1993

[30] Foreign Application Priority Data

Apr. 22, 1992 [JP] Japan ................. 4-102767

[51] Int. Cl.6 .............................. H02K 11/00
[52] U.S. Cl. ................................ 310/40 MM
[58] Field of Search .......... 310/40 MM, 194, 46, 310/89, 156, 51

[56] References Cited

U.S. PATENT DOCUMENTS 4,639,628 1/1987 Kobayashi et al. .......... 310/40 MM

FOREIGN PATENT DOCUMENTS 63-126205 5/1988 Japan .

Primary Examiner—Thomas M. Dougherty
Attorney, Agent, or Firm—McGlew and Tuttle

[57] ABSTRACT

A miniature motor comprising a rotor having a plurality of magnetic poles extending axially, which is disposed radially on the outer circumferential surface of the rotor, and a stator having two coils wound on coil bobbins, which are disposed axially in a housing formed into a bottomed hollow cylindrical shape; an end plate being fitted to an open end of the housing, in which the housing is made of a ferromagnetic material, the magnetic poles are provided on a housing-side end face of the rotor so that an axial magnetic attraction force is exerted between the rotor end face and the housing.

6 Claims, 2 Drawing Sheets

MINIATURE MOTOR WITH MAGNETIZED ROTOR END FACES FORMING AXIAL MAGNETIC ATTRACTION FORCE BETWEEN ROTOR AND HOUSING

BACKGROUND OF THE INVENTION AND RELATED ART STATEMENT

This invention relates generally to a miniature motor, such as a stepping motor, used for printers and facsimile machines, and more particularly to a miniature motor in which only a small number of component members are required, the axial relative movement of the rotor with respect to the housing is controlled, whereby preventing mechanical noise.

Stepping motors, one type of miniature motors, have heretofore been widely used as the drive gear for information processing equipment and various other equipment. FIG. 1 is a longitudinal sectional view illustrating the essential part of an example of stepping motor of a conventional type. In FIG. 1, numeral 1 refers to a housing made of a metallic material, such as mild steel, and formed into a bottomed hollow cylindrical shape, on the inner circumferential surface of which yokes 2 made of a ferromagnetic material and formed into a ring shape, coil bobbins 3 made of an insulating material and formed into a ring shape, and coils 4 wound on the coil bobbins 3 are provided. Numeral 5 refers to an end plate to be fitted to an open end of the housing 1.

Numeral 6 refers to a rotor made of a permanent-magnet material, such as ferrite, and formed into a cylindrical shape and having a plurality of magnetic poles extending axially, which are disposed radially on the outer circumferential surface thereof. Numeral 7 refers to a shaft fixedly fitted to the center of the rotor 6 and rotatably supported by bearings 8 provided on the housing 1 and the end plate 5. Numeral 9 refers to washers made of a resin material and formed into a ring shape, and fixedly fitted to the shaft 7 in such a manner that the washers 9 are interposed between an end face of the rotor 6 and the inner end face of the housing 1, and between the other end face of the rotor 6 and the inner end face of the end plate 5. A spring washer 10 made of a metallic material having spring properties is interposed between the rotor 6 and the end plate 5 in a state that the spring washer 10 is sandwiched between two washers 11 and 12.

With the aforementioned construction, as current is fed to the coils 4 via a connector 13 and a printed-circuit board 14, the yokes 2 are excited by a combination of two-phase currents flowing in the coils 4, causing the rotor 6 having a plurality of magnetic poles disposed on the outer circumferential surface thereof to rotate in short and uniform angular movements. Thus, power is transmitted to driven equipment in accordance with the short and uniform angular movements. Since the spring washer 10 is disposed between the two washers 11 and 12, the rotor 6 is prevented from being vibrated axially and mechanical noise is therefore prevented from being generated.

However, the prior-art means having the aforementioned construction for preventing the rotor 6 from being vibrated or moved axially has the following problems. The force pushing the rotor 6 towards the washer 9 on the side of the housing 1 is dependent on the amount of axial deflection of the spring washer 10. In order to ensure the optimum amount of deflection of the spring washer 10, therefore, it is necessary to finely adjust the axial free dimensions between the washers 9 and 12 with respect to the axial dimensions between the inner end faces of the housing 1 and the end plate 5.

To this end, a plurality of washers 9, 11 and 12 having different thicknesses have to be prepared in advance. In addition, a measuring tool or inspection tool is also needed to confirm whether the spring washer 10 has the optimum amount of deflection. All this makes the assembly work of miniature motors extremely complex.

Furthermore, even after the troublesome fine adjustment described above, variability in the resiliency of the spring washer 10 cannot be avoided. Consequently, the state of mutual friction and engagement tends to be unstable among the bearing 8, the washer 9 and the rotor 6 on the side of the housing 1, and among the washer 11, the spring washer 10, the washer 12 and the end plate 5 on the side of the end plate 5. As a consequence, the resulting loss of torque also tends to be variable. This adversely affects the output torque transmitted from the shaft 7.

SUMMARY OF THE INVENTION

This invention is intended to overcome the problems inherent in the prior art. Accordingly, it is an object of this invention to provide a miniature motor in which only a small number of component members are required, the rotor is prevented from being axially vibrated or moved, and mechanical noise is prevent from being generated.

DETAILED DESCRIPTION OF THE EMBODIMENTS

Figure 1:
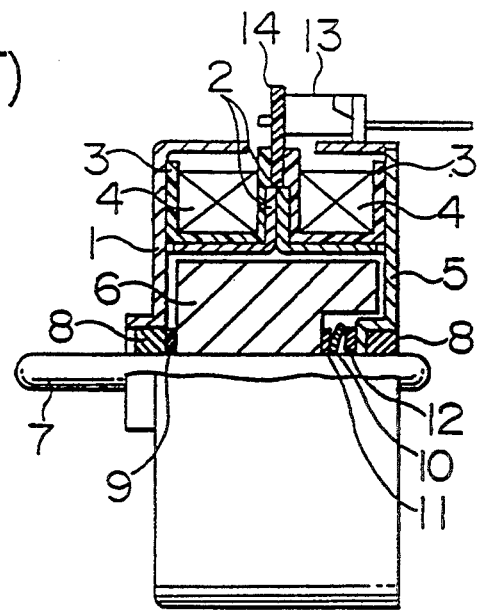
FIG. 1 is a longitudinal sectional view illustrating the essential part of a typical example of a stepping motor of a conventional type.
Figure 2:
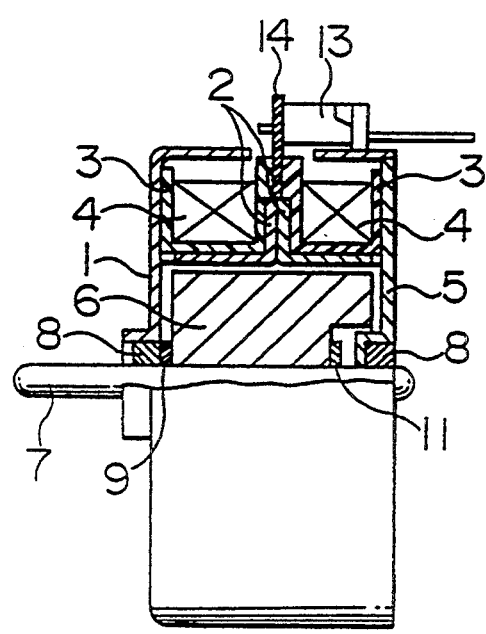
FIG. 2 is a longitudinal sectional view illustrating the essential part of an embodiment of this invention.

FIG. 2 is a longitudinal sectional view illustrating the essential part of an embodiment of this invention. Like parts are indicated by like numerals used in FIG. 1 above. In FIG. 2, the rotor 6 is made of a permanent-magnet material, such as ferrite, and formed into a cylindrical shape, as in the prior art shown in FIG. 1. The rotor 6 has a plurality of magnetic poles extending axially, which are disposed radially on the outer circumferential surface of the rotor 6, and is configured in such a manner that N and S magnetic poles are provided by magnetizing the rotor axially, as will be described later, so that a magnetic attraction force is exerted between the rotor 6 and the housing 1. The rotor 6 is fixedly fitted to the shaft 7 by fitting the rotor 6 to the shaft 7 via washers 9 and 11 made of a resin material (preferably having self-lubricating properties), for example, and provided on both end faces of the rotor 6.

Figure 3:
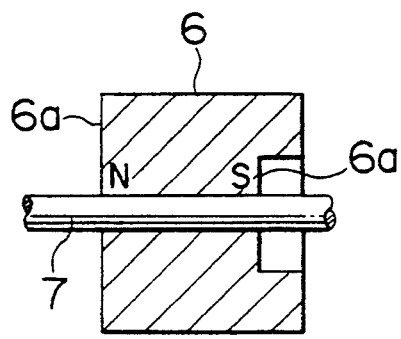
FIGS. 3 and 4 are a longitudinal sectional view and a left-side end view illustrating the rotor in FIG. 2.
Figure 4:
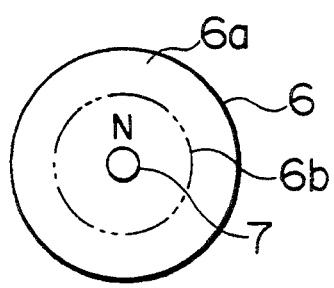

FIGS. 3 and 4 are a longitudinal sectional view and a left-side end view illustrating the rotor shown in FIG. 2. In FIGS. 3 and 4, numeral 6a denotes an end face facing the housing 1 (see FIG. 2), on which an N magnetic pole is provided in a region 6b shown by a chain line, and an S magnetic pole on the other end face 6d, as shown in FIG. 3. The magnetic field intensity of the magnetic pole provided in the region 6b is selected so that when the rotor 6 is disposed facing the housing 1, as shown in FIG. 2, a magnetic attraction force enough to prevent the axial relative movement of the rotor 6 can be generated. It is not desirable to set the magnetic field intensity of the magnetic pole to too high a level and make the area of the region 6b too large because adverse effects might be caused on the magnetic force generated by the magnetic poles provided on the outer periphery of the rotor 6.

Figure 5:
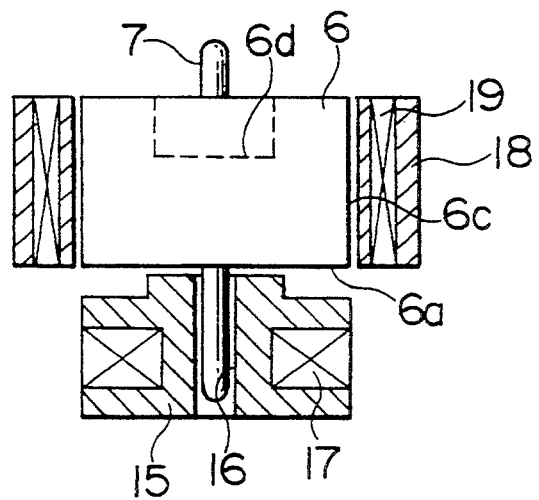
FIG. 5 is a longitudinal sectional view illustrating an example of a magnetizing means of the rotor in an embodiment of this invention.

FIG. 5 is a longitudinal sectional view illustrating an example of a rotor magnetizing means in an embodiment of this invention. In FIG. 5, numeral 15 denotes an end-face magnetizing yoke made of a ferromagnetic material, such as mild steel, and formed into a short cylindrical shape. The magnetizing yoke 15 has a shaft hole 16 at the center thereof and incorporating a coil 17. The coil 17 is disposed in such a manner that the region 6b on the end face 6a shown in FIG. 4 is magnetized into an N magnetic pole, for example, and the other end face 6d into an S magnetic pole. Numeral 18 denotes an outer-periphery magnetizing yoke made of a ferromagnetic material similar to the end-face magnetizing yoke 15 and formed into a ring shape, for example, and incorporating a coil 19 so as to magnetize the magnetic poles extending axially on the outer periphery of the rotor 6. The coils 17 and 19 each are connected to a d-c pulse power source, for example, via a control device.

With the aforementioned construction, as a d-c pulse current is fed to the coils 17 and 19 constituting the magnetizing yokes 15 and 18, magnetic poles are formed on the outer circumferential surface 6c and end faces 6a and 6d of the rotor. 6. By setting the magnetic attraction force exerted between the rotor 6 and the housing 1 shown in FIG. 2 to more than 1470N, for example, by the N magnetic pole obtained by magnetizing the end face 6a, the resulting magnetic attraction force can satisfactorily offset an axial load exerting onto the rotor 6. The magnetic field intensity of the magnetic poles provided on the end faces 6a and 6d can be adjusted arbitrarily by changing the voltage of the d-c pulse current being fed to the coil 17. Furthermore, by properly devising the layout of the coil 17 in FIG. 5, at least a pair of magnetic poles can be provided only on the end face 6a of the rotor.

This invention having the aforementioned construction and operation can reduce the number of component members, such as spring washers as used in the prior art. Furthermore, this invention can prevent mechanical noise from being generated by preventing the rotor from vibrating or moving in the axial direction since a magnetic attraction force is imparted between the rotor and the housing by the magnetic pole provided on the end faces of the rotor.

What is claimed is:

1. A miniature motor, comprising:
a rotor having a circumferential surface and end faces, said rotor having a plurality of magnetic poles extending axially and extending radially about said outer circumferential surface of said rotor; a stator having two coils wound on coil bobbins disposed axially; a housing formed into a bottomed hollow cylindrical shape, said housing receiving said two coils; an end plate connected to an open end of said housing, said housing being formed of a ferromagnetic material; a magnetic pole provided on a housing side end face of said rotor for magnetizing said end faces of said rotor.

2. A miniature motor according to claim 1, wherein said rotor has a magnetic pole on a housing side end face of a single polarity.

3. A miniature motor according to claim 1, wherein a pair of magnetic poles are provided on a housing-side end face of said rotor.

4. A miniature motor according to claim 1, wherein said magnetic attraction force between said rotor end face and said housing is more than 1470N.

5. A miniature motor, comprising:
a rotor for a miniature motor, the rotor having a circumferential surface and opposite end faces, said rotor having a plurality of magnetic poles extending axially and extending radially about said outer bobbins disposed axially; a housing formed into a bottomed hollow cylindrical shape, said housing receiving said two coils; an end plate connected to an open end of said housing, said housing being formed of a ferromagnetic material; a magnetic pole provided on a housing side end face of said rotor for magnetizing said end faces of said rotor, said end faces being magnetized with a single polarity to form an axial magnetic attraction force between said rotor and said housing.

6. A miniature motor, comprising:
a rotor for a miniature motor, the rotor having a circumferential surface and opposite end faces, said rotor having a plurality of magnetic poles extending axially and extending radially about said outer circumferential surface of said rotor; a stator having two coils wound on coil bobbins disposed axially; a housing formed into a bottomed hollow cylindrical shape, said housing receiving said two coils; an end plate connected to an open end of said housing, said housing being formed of a ferromagnetic material; a magnetic pole provided on a housing side end face of said rotor for magnetizing said end faces of said rotor, said end faces being magnetized with a single polarity to form an axial magnetic attraction force between said rotor and said housing, a first end face of N polarity and second end face of S polarity to form an axial magnetic attraction force between said rotor and said housing.

* * * * *